United States Patent
Bryborn

(10) Patent No.: US 7,249,716 B2
(45) Date of Patent: Jul. 31, 2007

(54) POSITION-CODING PATTERN

(75) Inventor: Mattias Bryborn, Lund (SE)

(73) Assignee: Anoto AB, Lund (SE)

( * ) Notice: Subject to any disclaimer, the term of this patent is extended or adjusted under 35 U.S.C. 154(b) by 193 days.

(21) Appl. No.: 10/516,590

(22) PCT Filed: Jun. 18, 2003

(86) PCT No.: PCT/SE03/01026

§ 371 (c)(1),
(2), (4) Date: Dec. 3, 2004

(87) PCT Pub. No.: WO03/107265

PCT Pub. Date: Dec. 24, 2003

(65) Prior Publication Data

US 2005/0145703 A1    Jul. 7, 2005

Related U.S. Application Data

(60) Provisional application No. 60/391,922, filed on Jun. 28, 2002.

(30) Foreign Application Priority Data

Jun. 18, 2002    (SE) ..................................... 0201846

(51) Int. Cl.
*G06K 19/06* (2006.01)
(52) U.S. Cl. ............. 235/494; 235/462.01; 235/462.08
(58) Field of Classification Search ................ 235/435, 235/439, 462.08, 462.01
See application file for complete search history.

(56) References Cited

U.S. PATENT DOCUMENTS

| 6,330,976 B1 * | 12/2001 | Dymetman et al. ......... 235/487 |
| 6,732,927 B2 * | 5/2004 | Olsson et al. ............... 235/454 |
| 6,957,768 B1 * | 10/2005 | Silverbrook et al. ........ 235/375 |
| 2003/0066896 A1 | 4/2003 | Pettersson et al. | |

FOREIGN PATENT DOCUMENTS

| WO | WO-01/16691 A1 | 3/2001 |
| WO | WO-01/26032 A1 | 4/2001 |
| WO | WO-01/41055 A1 | 6/2001 |
| WO | WO-01/48685 A1 | 7/2001 |
| WO | WO-01/71654 A1 | 9/2001 |
| WO | WO-01/75773 A1 | 10/2001 |
| WO | WO-01/75781 A1 | 10/2001 |

OTHER PUBLICATIONS

"Graphical Design Tool User Guide," Technical Publications at Anoto AB, 2001, 2002 Anoto AB, Sweden, Issue A.

* cited by examiner

*Primary Examiner*—Seung Ho Lee
(74) *Attorney, Agent, or Firm*—Birch, Stewart, Kolasch & Birch, LLP

(57) ABSTRACT

A product is on a surface provided with a first position code which codes coordinates for a plurality of first points. In at least one partial area on the surface, the product is further provided with a second position code which codes coordinates for a plurality of second points. The partial area further comprises a field which is associated with a predetermined function to be performed in consequence of a user unit being placed in the field. Methods and devices for coding and for recording of information from a surface are also described.

28 Claims, 7 Drawing Sheets

POSITION-CODING PATTERN

CROSS-REFERENCE TO RELATED APPLICATIONS

The present application claims the benefit of Swedish patent application No. 0201846-3, filed on 18 Jun. 2002 and U.S. Provisional patent application No. 60/391,922, filed on 28 Jun. 2002, which both are hereby incorporated by reference.

Methods, apparatuses, products and computer programs relating to the same technical field as the present application are furthermore disclosed in U.S. provisional patent application No. 60/323,694, filed on 21 Sep. 2001 and subject to an obligation of assignment to the assignee of the present application.

FIELD OF THE INVENTION

The present invention relates to a product which on a surface is provided with a first position code which codes coordinates for a plurality of first points.

The invention also relates to a method for coding, a coding device and a method and a device for recording information from a surface.

BACKGROUND OF THE INVENTION

It is already known that it is possible to digitize handwriting by determining how a pen used to create the handwriting is moved. One way of doing this is to use a base for the handwriting provided with a position-coding pattern which codes coordinates for points on the base, and also to provide the pen with a sensor which records the position-coding pattern locally at the tip of the pen as the pen is moved across the base. A processing unit, which can be placed in the pen or at a distance therefrom, can then decode the recorded position-coding pattern so that the movement of the pen across the base can be determined as a series of coordinates.

WO 01/26032, which is assigned to the applicant of the present application, describes a position-coding pattern which can be used precisely for digitizing handwriting. The pattern is made up of marks, which for example can be in the form of dots. Each dot has a nominal position represented by an intersection between two lines in a virtual raster, for example a square grid. Each dot codes a fixed value depending on its location in relation to the nominal position. The dots can have four possible locations, for example, one on each of the four raster lines extending from the intersection, the four different locations coding four different values. The coordinates of a point are coded with the aid of a plurality of dots, for example 6*6 dots. However, each dot contributes to the coding of the coordinates of a plurality of points. If a sensor first reads 6×6 dots and is thereafter moved one dot distance to the side or vertically, the sensor will read dots which code the coordinates of a new point. This type of pattern in which the position resolution is smaller than the size of the partial surface required for determining a position is in the present application referred to as "floating".

Using the position-coding pattern in the above-mentioned WO 01/26032, coordinates for a very large number of points can be coded, theoretically $4^{36}$ points if each point is coded with 6*6 dots. All these points can be said to form an imaginary surface or form dots in a coordinate system.

WO 01/48685, which is also assigned to the applicant of the present invention, describes how such an imaginary surface can be used for information management. More specifically, different partial areas on the imaginary surface are dedicated to different types of information management. It is then possible to control how information which is recorded digitally is to be handled by providing bases with a position-coding pattern which corresponds to different partial areas on the imaginary surface. For example, a first base can be provided with a position-coding pattern which means that information which is written on the position-coding pattern and is recorded digitally by the pen is sent to a predetermined computer for storage in the latter. Correspondingly, another base can be provided with a position-coding pattern which means that information which is recorded digitally with the aid of this position-coding pattern is sent as an e-mail to an address indicated by the user on the base.

WO 01/48685 also describes how the pen which records the position-coding pattern can store different digital templates, which define how the information from different parts of physical bases with position-coding patterns is to be interpreted. An e-mail template can, for example, specify that a base with a corresponding position-coding pattern has a first field which is intended for a message, a second field which is intended for an e mail address to be interpreted by ICR (Intelligent Character Recognition), and a third field which constitutes a send box which the user ticks in order to initiate the sending of a recorded message.

Different bases can have fields with different functions. The number of fields can be different on different bases. The fields can further be located in different places on the bases, which besides may be of different sizes.

As is also described in WO 01/48685, the position-coding pattern can be arranged differently on the physical base. According to a first alternative, the position-coding pattern on the base can be continuous, which means that it corresponds to a continuous area of the imaginary surface. The processing unit which is to interpret and process the digital information recorded from the base must then know the layout of the base, i.e. which fields there are on the base and where these are located. If many different layouts are allowed, which is of course desirable, many different digital templates must be stored so as to be accessible to the processing unit. This is particularly a problem if the processing unit has a limited storage capacity and/or if it takes a long time to change the information once it has in fact been stored. This may be the case, for example, if the processing unit is arranged in a portable user unit, such as the pen in WO 01/48685.

According to a second alternative, the position-coding pattern on the base can correspond to a combination of a plurality of separate partial areas on the imaginary surface so that the position-coding pattern on the base will be discontinuous. In the above example the first field can then correspond to, for instance, a first partial area on the imaginary surface which is dedicated to message information, the position-coding pattern in the second field can correspond to a second partial area which is dedicated to address information which is to be processed by ICR, and the position-coding pattern in the third field can correspond to a third partial area which is dedicated to send boxes. In this case, the location of the fields on the base is thus not related to the location of corresponding partial areas on the imaginary surface. In this alternative, the unit which is to interpret and process the digital information from the base has to store a smaller quantity of information because it only needs to know the coordinates of the different partial areas on the imaginary surface.

In certain situations, however, a continuous position-coding pattern on the base is still to be preferred. If the pattern is of the floating type, positions will not be able to be defined in a boundary area between two different fields in the discontinuous position-coding pattern since the dots in the boundary area do not code coordinates for adjacent points on the imaginary surface. One way of solving this problem is to have no position-coding pattern in the boundary area so that points belonging to one or the other field can be detected unambiguously. Such boundary areas without position-coding pattern can be undesirable, especially when the product is small.

A further problem with a discontinuous position-coding pattern on the base may arise if the sensor in the pen is displaced from a pen point of the pen used to make graphical notes on the physical base. It may then happen that the pen point is placed in a first field in the discontinuous position-coding pattern, but that the sensor, owing to the displacement, records the position-coding pattern in another field on the base, which in turn may result in the pen not performing the function intended by the user.

The position-coding pattern corresponding to a digital template can be applied as it is on a base. Alternatively, different partial areas of the position-coding pattern corresponding to the digital template can be "cut out" and arranged in a different spatial arrangement on the base. The different partial areas of the digital templates correspond to different fields, which may have different functions, on the base.

The pen does not need to know the spatial arrangement of the different fields on the base in order to determine how to handle coordinates recorded from the base. However, if the movement of the pen over the base is to be displayed by an external unit, e.g. a PC, to which the coordinates are sent, the PC needs to know the spatial arrangement of the fields on the base. Unfortunately, the PC cannot determine the spatial arrangement from the coordinates sent to it from the pen.

SUMMARY OF THE INVENTION

An object of the present invention thus is to make it possible for a user unit having a limited storage capacity to handle templates for bases with position-coding patterns.

Another object of the present invention is to provide bases with position-coding patterns, which can be read correctly using a user unit which has a displacement between on the one hand a pen point that can be used to make marks on the base and, on the other hand, a sensor which records the position code.

Yet another object of the present invention is to enable a unit, which receives information recorded by means of a pen and a position-coding pattern on a base, to re-create the movement of the pen over the base.

One or more of these objects and other objects that appear from the above and the following description are wholly or partly achieved by a product according to claim 1, a method for coding according to claim 13, a coding device according to claim 18, a method for recording information according to claim 19, and a device for recording information according to claim 25.

More specifically, the invention concerns according to a first aspect a product, which on a surface is provided with a first position code which codes coordinates for a plurality of first points and which in at least one partial area on the surface is further provided with a second position code which codes coordinates for a plurality of second points, said partial area comprising a field which is associated with a predetermined function which is to be performed in consequence of a user unit being placed in the field.

The first position code extending over the surface enables position determination over the entire surface. It also makes it possible for a user unit to electronically record information written on the surface by means of a pen point of the user unit. The first position code can be said to correspond to the continuous position-coding pattern mentioned by way of introduction.

The second position code makes it possible to mark on the surface one or more fields so that a user unit electronically can detect that its pen point is located in a certain field on the surface and that a determined function thus is to be performed. The first and second position code may thus together create a position-coding pattern which to some extent resembles the discontinuous position-coding pattern mentioned by way of introduction. By both the first and the second position code being located in the partial area, the problem with areas with undefined coordinates in the transition to the partial area, however, is reduced. Furthermore the problem with the memory intensive storage of templates as well as the problem with the displacement of the pen point can be solved.

The idea behind the invention is based on use of the first position code for a first purpose and the second position code for a second purpose. Therefore it must be possible to distinguish the first and the second points from each other and to separately decode the coordinates for the first and the second points.

The first points and the second points can be distinguished from each other by being points in a first and a second coordinate system respectively. Some or all of the first coordinates and the second coordinates can then have the same nominal values.

The first points and the second points can alternatively be distinguished from each other by relating to different coordinate areas in one and the same coordinate system. The coordinates coded by the first position code and the coordinates coded by the second position code consequently have different nominal values.

The partial area can be larger than the field. This condition may be convenient when there is a displacement between a sensor of a user unit and a point, such as a pen point, of the user unit which can be used by the user to indicate positions on the product surface. Knowing the size of the displacement makes it possible for the user unit to determine the location of the pen point in the partial area, and knowing the field's extent and location in the partial area makes it possible for the user unit also to determine whether the pen point is located in the field or not.

The first and the second position code can be indicated in different ways on the product. For example, the second position code can be spatially separated from the first position code. If the location of the first and the second position code can be determined, then the first and the second position code can be indicated in the partial area in an identical manner. Alternatively, they may of course be indicated in different ways.

The coordinates of a point can be coded by means of a single symbol. Alternatively, the coordinates for each of said plurality of first points can be coded by means of a first plurality of marks, and the coordinates for each of said plurality of second points can be coded by means of a second plurality of marks. Thus both the first and the second position code can be of the floating type.

The first position code and the second position code can be spatially coinciding in the partial area. At least some of the marks in the partial area are then common to the first and the second position code, and the first position code can be coded by variation of a first parameter of the common marks and the second position code can be coded by variation of a second parameter of the common marks. For example, the first position code can be coded by the locations of the marks in relation to a number of nominal points being varied, and the second position code by the shape of the marks being varied.

By means of the second position code, one or more function fields can, as mentioned above, be marked on the surface provided with the first position code. This can be done in a flexible way without a large number of digital templates needing to be stored.

More specifically, the total coordinate area that can be coded by means of the second position code can be divided into smaller coordinate partial areas, in each of which a coordinate field is defined, associated with a predetermined function. Furthermore information about the size of a corresponding coordinate area in the first position code can be associated with one or more of these coordinate partial areas. Such a coordinate partial area corresponding to the second position code is then assumed, in decoding, to be associated with the coordinate area of the indicated size, corresponding to the first position code, all information recorded from the coordinate area corresponding to the first position code being processed as belonging together. In some cases, the function associated with the coordinate field can be performed for all information recorded with the corresponding part of the first position code. The division of the total coordinate area coded by the second position code can be stored in a description in a memory of the device which is to record information from a product with the first and the second position code. Since that part of the second position code which codes a certain coordinate partial area can be used to mark fields on different parts of the first position code, i.e. within completely different coordinate areas coded by the first position code, the above description will require much smaller storage space than the storage space that would be required to store corresponding digital templates when using the continuous position-coding pattern described by way of introduction. This means that a large number of digital templates are replaced by a single digital template which describes the division of the total coordinate area coded by the second position code.

The second position code can furthermore be used for enabling a unit, which receives information recorded by means of a pen and a position-coding pattern on a base, to re-create the movement of the pen over the base.

More particularly, if the surface comprises at least two adjacent fields, wherein the first position code in said at least two adjacent fields codes coordinates within at least two non-adjacent coordinate areas, the problem can be solved by letting the second position code extend over said at least two adjacent fields, so that the position information from the second position code can be used to determine how a pen which has recorded coordinates in the non-adjacent coordinate areas by means of the first position code, was moved over the surface when recording the coordinates.

BRIEF DESCRIPTION OF THE DRAWINGS

The present invention will now be described by way of embodiments with reference to the accompanying drawings, in which.

DESCRIPTION OF EMBODIMENTS

Figure 1:
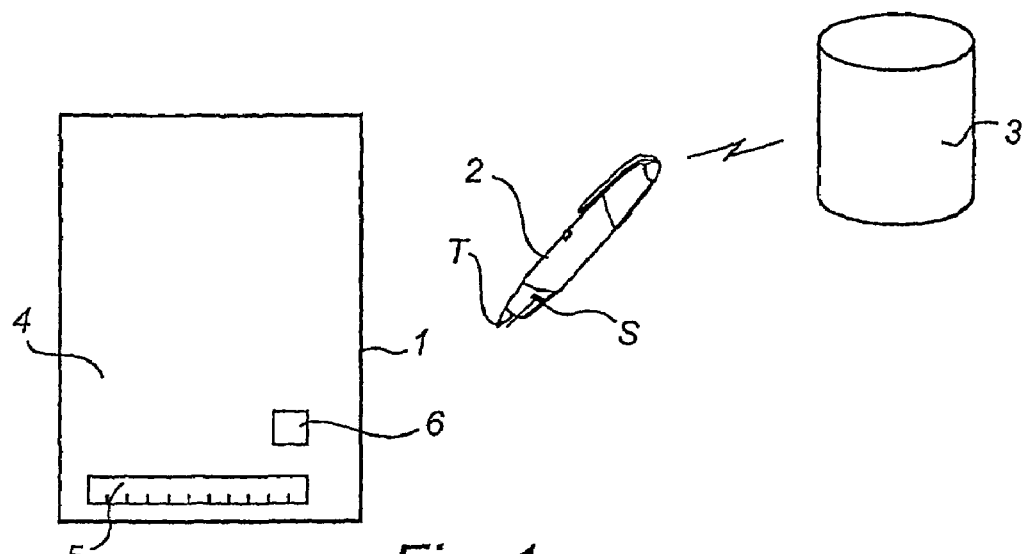
FIG. 1 shows schematically a prior-art system for information management, which system uses a coding pattern for controlling the information management.

FIG. 1 shows schematically a system for information management in which the present invention can be used. The system comprises a base 1 in the form of a sheet of paper, a user unit 2 and an external unit 3. The paper 1 is provided with a position-coding pattern (not shown in FIG. 1). The user unit 2 is used to write on the paper 1 using a pen point T and to simultaneously record the pen strokes in digital form by means of a sensor S which images the position-coding pattern on the paper 1. The digitally recorded information can be processed in the user unit 2 and/or the external unit 3, to which it can be sent automatically or at a signal from the user.

The paper 1 shown in FIG. 1 is an example of a form which can be used for graphic e-mail messages. It has three different fields 4-6, a first field 4 constituting a message field, a second field 5 constituting an address field and a third field 6 constituting a send box. The different fields are marked on the paper in a way that makes the user understand which fields are which and for what they are to be used. The fields can, for example, be marked with frames and explanatory texts or symbols.

Information recorded digitally from the paper is to be processed differently by the user unit 2 depending on from which field it originates. Information recorded from the message field 4 is to be processed as part of the actual graphic e-mail message. Information recorded from the address field is to be interpreted by ICR (Intelligent Char acter Recognition) for the address to which the e mail message is to be sent to be determined by the user unit. Information recorded from the send box 6, however, is to be interpreted as a request that the graphic e mail message is to be sent to the address recorded from the address field 5.

To this end, the user unit 2 must be able to determine from which field different parts of the recorded information originate. This is achieved by the position-coding pattern on the paper comprising on the one hand a first position code that is used to digitally record the information written on the paper and, on the other hand, a second position code that is used to "mark" the different fields for the user unit. In this example it is assumed that the first position code codes coordinates for first points in a first coordinate system and the second position code codes coordinates for second points in a second coordinate system. Different functions or properties can be associated with different coordinate areas in the first and the second coordinate system.

Figure 2:
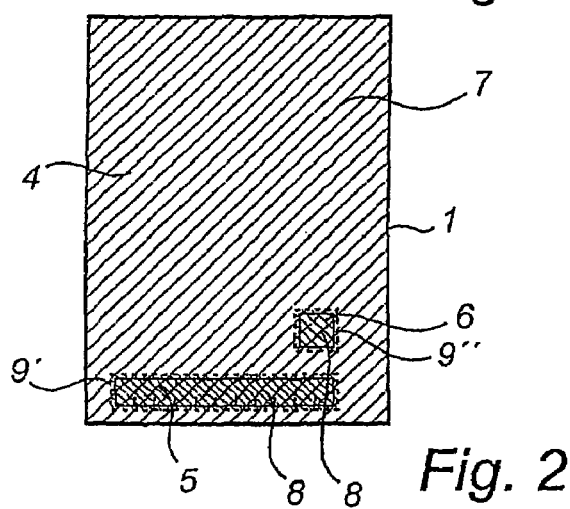
FIG. 2 shows schematically how a first and a second position code are arranged on a sheet of paper with different fields.

FIG. 2 shows schematically that the first position code 7, which is indicated by lines tilted to the right, extends over the surface of the entire sheet of paper and thus enables digital information recording over the entire surface, while the second position code 8, which is indicated by lines tilted to the left, extends merely in partial areas 9' and 9" where it is used to mark fields for the user unit 2. As is evident from FIG. 2, the partial areas 9' and 9" are larger than the corresponding fields 5 and 6. The purpose of this is that the user unit 2 should be able to detect the fields even if it has a pen point and a sensor which are offset from each other.

Figure 3:
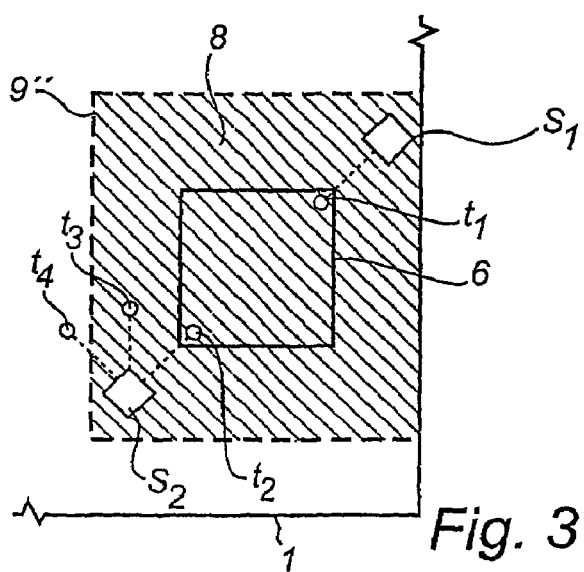
FIG. 3 shows schematically the second position code and a field defined by the same.

This is illustrated in more detail in FIG. 3, which schematically shows part of the paper 1 with the send box 6 and the partial area 9", the second position code 8 extending over the partial area 9". Also the first position code 7 is located in this partial area 9", but is not indicated in the Figure for the sake of clarity. The size of the partial area 9" relative to the field is such that, independently of where the pen point T of the user unit is located and independently of the rotation of the user unit 2 about its own axis, the sensor will always be located in the partial area 9" and thus be able to detect the second position code 8.

This is illustrated in FIG. 3 with the aid of two different pen point positions t1 and t2 and associated sensor positions s1 and s2. By the sensor recording the second position code 8, the user unit can determine the coordinates coded by the second position code 8 in the field of view of the sensor S. Thus, the sensor unit 2 can determine the position of the sensor S in the partial area 9". Knowing the pen point displacement and the rotation of the pen about its own axis in relation to the position-coding pattern, the user unit 2 can further calculate where the pen point T is located. If the user unit also knows where in the partial area 9" the field 6 is placed, it can finally determine whether the pen point T is located in the field or not and, thus, how the information simultaneously recorded digitally via the first position code is to be processed.

In this way, the user unit can thus distinguish the cases shown in FIG. 3 where the sensor is located in the position S2, but the pen point is located in the position t2, i.e. in the field 6, or in the position t3, i.e. within the partial area 9" but outside the field 6, which means that the pen point is in the message field 4, or finally in the position t4, i.e. outside the partial area 9", which also indicates that the pen point is in the message field 4.

In this example, the message field 4 thus is not marked by means of the second position code 8, but the message field constitutes the entire part of the paper 1 which is provided with the first position code 7 and which does not consist of the address field 5 and the send box 6. The address field 5 and the send box 6 can further be distinguished from each other by the second position code 8 in the respective partial areas 9' and 9" of the address field 5 and the send box 6 coding coordinates for points within different coordinate partial areas in the second coordinate system.

Figure 4:
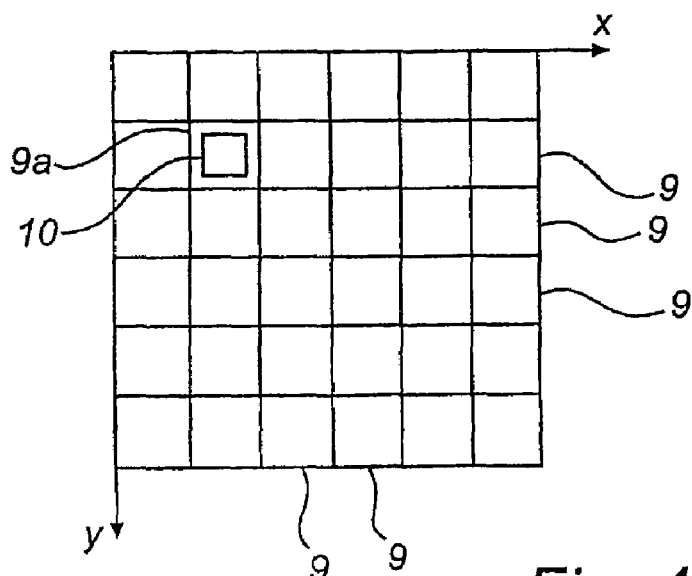
FIG. 4 illustrates schematically how the second coordinate system is divided into coordinate areas.

This is illustrated in FIG. 4, which schematically shows the second coordinate system with its coordinate axes x and y. The second coordinate system is divided into different coordinate partial areas 9 that are used to mark fields with different functions on a surface provided with the first position code so that a user unit can detect that it is placed in such a field on the surface. The field on the surface is defined by a coordinate field centrally in each coordinate partial area. For the sake of simplicity, only one such coordinate field is shown in FIG. 4, viz. the coordinate field 10 in the coordinate partial area 9a. In this example, the coordinate field 10 is assumed to be associated with a send box function corresponding to the send box 6 in FIGS. 1-3. In FIG. 4, all coordinate partial areas 9 have the same size and shape, but it is of course possible to choose to divide the second coordinate system into coordinate partial areas 9 with different sizes and different shapes. Thus also the coordinate fields can have different sizes and different shapes. If this is the case, the size and shape of the coordinate fields must be associated with the respective coordinate partial areas 9 so that the user unit 2 knows which points in the second coordinate system are included in the different coordinate fields.

The different coordinate fields in the second coordinate system can further be associated with different functions, which also means that corresponding fields on the surface are associated with corresponding functions. Each coordinate field can have one or more associated functions.

One example of a function is that the user unit 2 is to give feedback to the user when it detects that it is placed in a certain field on the surface. The feedback can be given, for example, as a sound signal, a light signal or a tactile signal generated by the user unit 2.

Another example of a function that may be associated with a coordinate field is the function that the user unit is to send digitally recorded information when it detects a send box, such as the send box 6 in FIGS. 1-3. In this example, it is the information that has been recorded from the sheet of paper 1 by means of the first position code on this sheet that is to be sent when the send box 6 is detected. Then the user unit 2 must be able to determine which of the information recorded by the user unit originates from precisely the sheet of paper 1 in contrast to other sheets of paper or bases from which information may also have been recorded in the user unit. More specifically, the user unit must be able to determine which of the coordinate pairs recorded by means of the first position code belong to that coordinate area in the first coordinate system which corresponds to the first position code on the sheet of paper 1. To this end, a page size and an offset are associated with each of the coordinate partial areas 9 in the second coordinate system which has an associated send box function.

Figure 5:
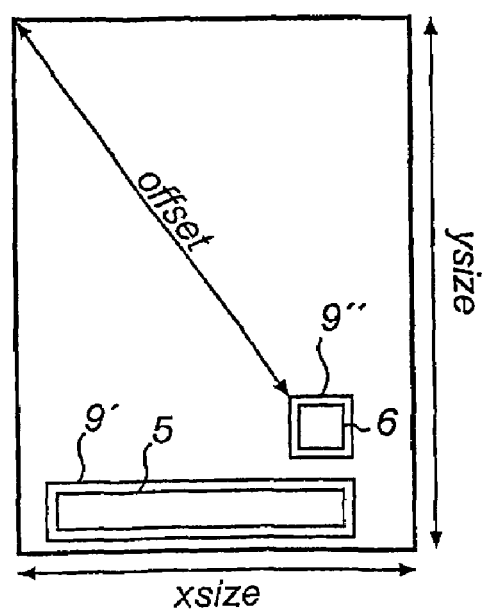
FIG. 5 illustrates schematically the terms page size and offset which are associated with coordinate areas with send box function.

FIG. 5 illustrates the terms page size and offset. More specifically, FIG. 5 shows once more the sheet of paper 1 in FIG. 1. The partial area 9" is provided with a second position code which codes coordinates for points in the coordinate partial area 9a in the second coordinate system in FIG. 4. As mentioned above, the coordinate field 10 with a send box function corresponding to the send box 6 is defined in the coordinate partial area 9a. With the coordinate partial area 9a are further associated two variables Xsize and Ysize which define the size in x and y direction on that page, i.e. coordinate area in the first coordinate system, which is associated with the coordinate field 10 and thus with the send box 6. Moreover, an offset indicating where on the page the partial area 9a is located is associated with the coordinate partial area 9a. The offset is indicated as a displacement in x and y direction from the upper left corner on the page.

Now assume that the user unit on the sheet of paper 1 has detected coordinates for a first point in the first coordinate system and a second point in the second coordinate system. If the user unit knows the division of the second coordinate system into coordinate partial areas and coordinate fields, it can now determine in which of the coordinate partial areas the second point is located. With a possible knowledge of displacement between its sensor and its pen point, the sensor unit can further determine whether the pen point is located in a field on the paper. If this is the case, it can identify a function associated with the field. Now assume that the user unit 2 determines that the second point corresponds to a location of the user unit's pen point T in the send box 6. The user unit 2 can then with the aid of the associated page size, the offset and the coordinates for the first point in the first coordinate area determine, for instance, which coordinates are coded in the upper left corner and the lower right corner on the paper 1. Thus, the user unit 2 knows which parts of the information digitally recorded in the form of coordinates originate from the paper 1 and can send this information.

The second coordinate system may contain a plurality of different coordinate partial areas with associated send boxes with different associated page sizes and offsets, so that largely all conceivable pages with all conceivable locations of send boxes can be provided by the send boxes being marked with the second position code.

As a further example of the function that can be associated with a field, ICR interpretation may be mentioned. The function means that what is being written in the field is to be interpreted by ICR to a character-coded format.

When the user unit detects that digitally recorded information originates from an ICR field, it can mark that the digitally recorded pen strokes are ICR pen strokes. When the send box 6 is detected and the page size has been determined, the user unit can compile all ICR pen strokes coming from the page belonging to the detected send box and interpret these by ICR. In this manner, the user unit can determine, for example, an address to which an e mail message is to be sent or a heading or a title in a message.

It should be emphasized that fields with an associated ICR function or feedback function can be located optionally relative to the first position code.

A description of the second coordinate system's division into coordinate partial areas 9, the coordinate fields thereof and the information associated therewith is in this embodiment stored in the user unit 2 so that the user unit can perform some processing of the recorded information without communicating with external units.

In the following the first and the second position code will be described in more detail.

The first position code extends, as mentioned above, over the entire paper 1 and is used to digitally record the pen strokes made by the user unit on the paper 1.

Figure 6:
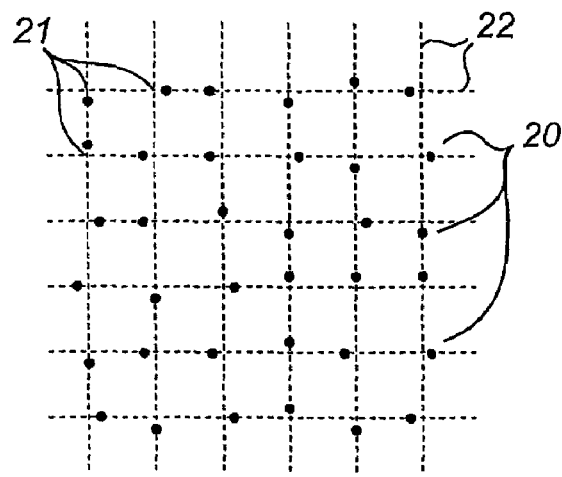
FIG. 6 shows schematically how the first position code is made up.

In this example, coordinates for points in the first coordinate system are coded by means of the first position code in the way described in WO 01/26032 mentioned by way of introduction. As illustrated in FIG. 6, the position information is then recorded by means of marks 20, here in the form of dots. Each dot has a nominal position 21 which is given by the intersection between the lines 22 in a raster. The raster can be virtual but is here for the sake of clarity indicated by dashed lines. Each dot may be situated in one of four predetermined locations in relation to the nominal position, viz. on a raster line above, to the right, below or to the left of the nominal position. FIG. 6 shows examples of the different locations. Depending on the location, the dot may, for instance, code the bit pairs (0,0; 0,1; 1,0; and 1,1). A position can, as mentioned by way of introduction, be coded by 6*6 dots. The position is obtained as a coordinate pair. With 6*6 dots, theoretically $4^{36}$ unique coordinate pairs can be coded. These coordinate pairs or points can be said to jointly form an imaginary surface or a first coordinate system where the resolution between the points corresponds to the distance between the dots on the paper. The principles of the decoding from the 6*6 bit pairs to coordinate pairs are described in detail in the above-mentioned WO 01/26032 and will therefore not be repeated here.

Figure 7:
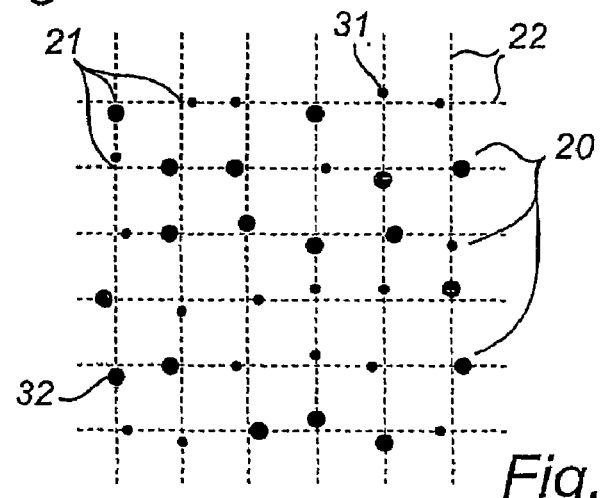
FIG. 7 shows schematically how the first and the second position code are coded by means of a common coding pattern.

In the first position code, the position information is thus coded in this example by the locations of the dots being varied. In the second position code, the position information is instead coded by the size of the dots being varied. FIG. 7 shows an example of this. Each dot now has, not only a location, but also a size value. In this example, each dot has either the size value "small" (see for instance the dot 31) or the size value "large" (see for instance the dot 32).

The second position code could code position information with the same resolution as the first position code if, for instance, each dot was allowed to have one of four possible size values and 6*6 dots were allowed to correspond to a position.

Since, as will be evident from the following, the same number of positions is not required in the second position code, it is instead possible to let the second position code have a lower position resolution and make the second position code more robust.

Figure 8:
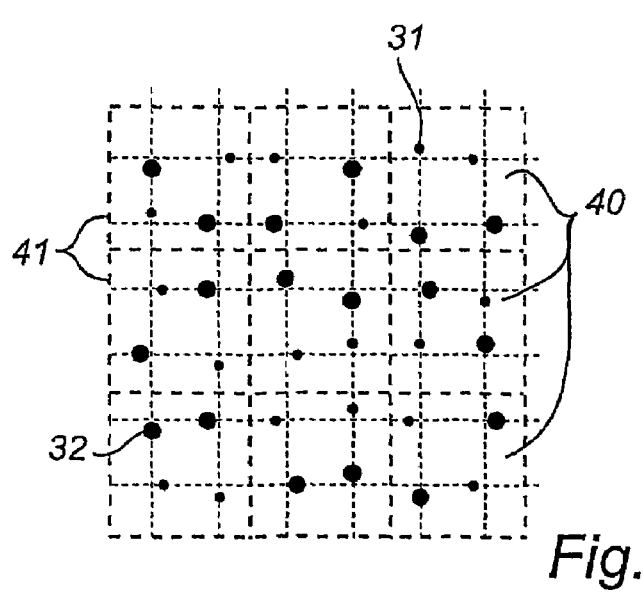
FIG. 8 shows schematically how the second position code is divided into cells.

To this end, the second position code, as schematically shown in FIG. 8, is divided into cells 40, each containing four dots. The cells are usually not marked on the base on which the position-coding pattern is located, but are virtual cells. For the sake of clarity, however, they are marked with dashed lines 41 in FIG. 4.

In this example, each cell contains four dots. Cells with a different number of dots may, of course, be used. Nor do the cells have to be square like in this example, but may have other shapes, such as rectangular, triangular or hexagonal. The preferred shape can be affected by the configuration of the raster for the dots. All cells need not necessarily be of the same size, as long as it is possible to determine their extent.

As is evident from FIG. 8, the cells do not overlap each other, but they are fixed in relation to the first position code, which makes it easy to determine their location as soon as the first position code has been decoded.

In this example, the coordinates for each point in the first coordinate system are coded with 6*6 dots, as mentioned above. Furthermore, the coding is "floating", which means that each set of 6*6 dots codes coordinates for a unique point in the first coordinate system. The coordinates are defined for the upper left dot in each 6*6 set. This fact can be used to determine the location of the cells for the second position code. In this example, the upper left corner of each cell has in fact an even x coordinate and an even y coordinate.

Figure 9:
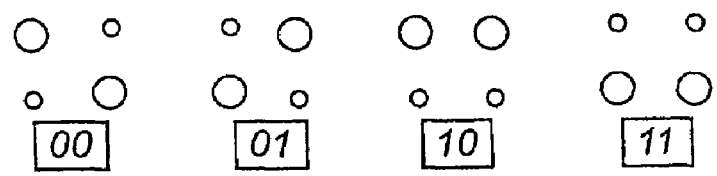
FIG. 9 illustrates how different possible cell values are coded in the second position code.

For increased robustness in coding, each cell further contains in this example merely two large dots and two small dots. This makes it possible to code six different values for each cell, but in this example only four of the possible combinations are used. The used combinations and the values coded by them are shown in FIG. 9. In the areas where the second position code is not present, the cells will only contain small dots. The absence of cells of different sizes thus indicates in this example the absence of the second position code.

By the cells in the second position code coding four different values, coordinates for points in the second coordinate system can be coded in the same way as coordinates for points in the first coordinate system. The principles of the above-mentioned WO 01/26032 are thus applicable if the dots in the first position code are replaced by the cells in the second position code. However, in this example the coordinates for each point in the second coordinate system are allowed to be coded by 3*3 cells, which corresponds to 6*6 dots. With these 3*3 cells, it will be possible to code coordinates for $4^9=262144$ unique points in the second coordinate system. These points in the second coordinate system can be said to jointly form a second imaginary surface.

The first and the second position code are in this example coded graphically by means of the dots with different locations and different sizes. These dots jointly form a position-coding pattern which can be arranged on a product, such as the paper in FIG. 1.

When the position-coding pattern is to be arranged on a product, it can be fetched in a completed state from a dedicated storage. Alternatively, the coding of the position-coding pattern can take place in a coding device, for example at a party who wants to create a page with a special layout for information management.

Figure 10:
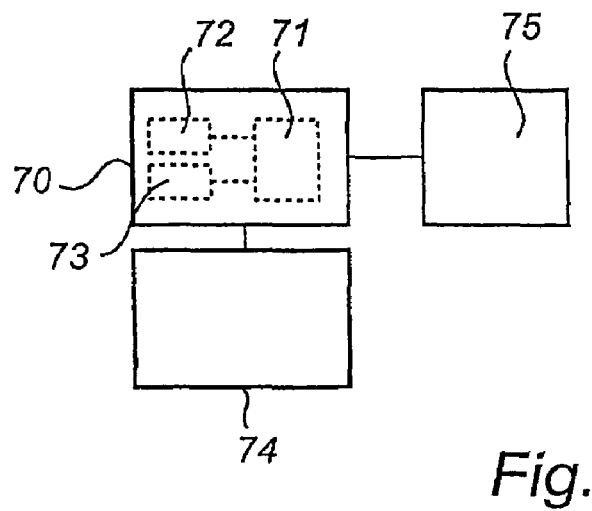
FIG. 10 shows schematically a coding device.

One example of a coding device is shown schematically in FIG. 10. The coding device, which for instance can be realized using an ordinary personal computer, comprises a processor unit 70 which in addition to the actual processor 71 comprises a working memory 72 and a program memory 73 which stores a program for providing the position-coding pattern. Moreover the coding device comprises an input means 74 which makes it possible for a user to input information about a desired layout to the processor. The input means 74 can be, for example, a keypad or a mouse or an equivalent input unit which is normally used together with a computer. To the coding device there can also be connected a unit 75 which on the basis of the digital representation of the position-coding pattern arranges the graphic position-coding pattern on a product. The unit may consist of, for example, a printer printing the coding pattern on a paper, or alternatively, of some other kind of printing device.

Figure 11:
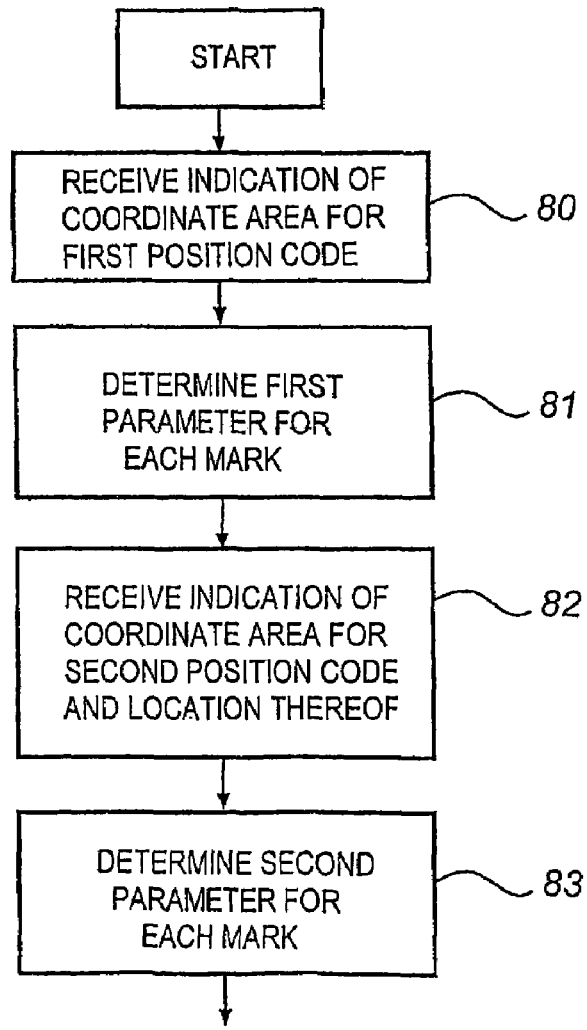
FIG. 11 is a flow chart and shows an example of how coding of the first and the second position code can be carried out.

Now the coding will be described with reference to the flow chart in FIG. 11.

In a first step 80, the processor 71 in the coding device receives an indication, inputted by the user, of which coordinate area the first position code is to code. The indication may consist of a choice among predefined coordinate areas or of an explicit indication of an area in the form of e.g. a coordinate pair which defines the upper left corner of the area, and a width and a height of the page. In conjunction with this step, space is allocated in the working memory 72 for storing a digital representation of the coding pattern. For each mark included in the coding pattern, the processor then calculates in step 81 a value for a first parameter which in this example is the location of the mark, according to a predetermined algorithm. The above-mentioned WO 01/26032 describes how such an algorithm can be composed. The value of the first parameter for each mark is stored in a first matrix in the working memory 72. For instance, the value may be given as a number between 0 and 3, where 0 indicates that the mark is offset to the right from its nominal position, 1 that it is offset upwards, 2 that it is offset to the left and 3 that it is offset downwards.

Subsequently the processor 71 receives an indication of at least one partial area which is to be indicated by means of the second position code and the location of this partial area within the coordinate area coded by the first position code, step 82. The indication may comprise a choice of one or some of the coordinate areas in the second coordinate system in FIG. 4, i.e. a choice among predetermined coordinate partial areas. If the chosen coordinate partial area is associated with a send box function, its location in the coordinate area coded by the first position code is given by the associated offset information. (Besides, in this case the size of the coordinate area coded by the first position code is also given by the associated page size information.) If the chosen coordinate partial area has another associated function, it may in this example be placed freely within the coordinate area coded by the first position code. The indication then also comprises a location which may be given by a coordinate pair within the coordinate area coded by the first position code. On the basis of the indication in step 82, the processor determines a second matrix which defines the cell values for that part of the coordinate area coded by the first position code which corresponds to the location of the chosen coordinate partial area. Alternatively, the second matrix may define the cell values for the entire coordinate area coded by the first position code. The second matrix constitutes an input signal to the next step in the coding. In the following step, the processor 71 determines on the basis of the second matrix and according to a predetermined algorithm also a value of a second parameter for each of the marks, step 83, and stores these calculated values in the memory. More specifically, the processor determines a third matrix which is of the same size as the first matrix, the processor assigning to each mark the value zero or four, where zero indicates a small dot and four a large dot. The algorithm for calculating the value of the second parameter can be determined by a person skilled in the art based on the above description and the above-mentioned WO 01/26032. Finally, the first and the third matrix are added up by the values of marks, corresponding to each other, in the first and the third matrix being added up so that a fourth matrix is formed where each element has a value between zero and seven. Each element corresponds to a mark in the position-coding pattern and defines its location and size as follows:

0=small dot, offset to the right
1=small dot, offset upwards
2=small dot, offset to the left
3=small dot, offset downwards
4=large dot, offset to the right
5=large dot, offset upwards
6=large dot, offset to the left
7=large dot, offset downwards When the coding is completed, the position-coding pattern can, if desired, be printed by means of the printer 75. The fourth matrix may, for example, be sent to a program generating a PostScript file for direct printing on the printer.

Figure 12:
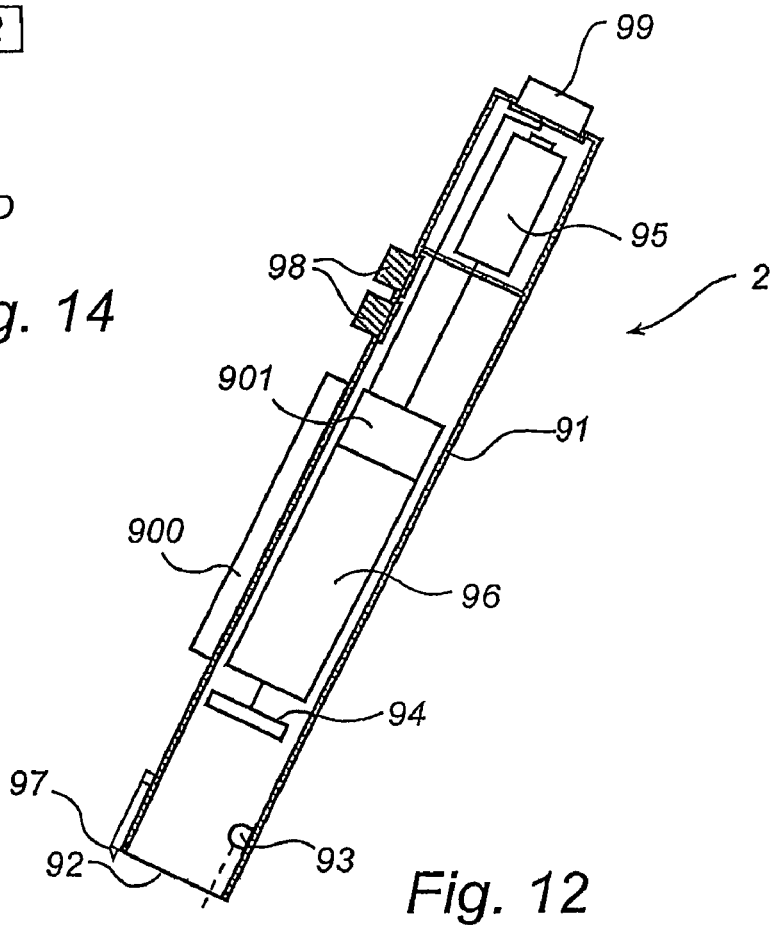
FIG. 12 shows schematically a decoding device.

FIG. 12 shows an example of how it is possible to realize the user unit 2 in FIG. 1, which can be used as a decoding device. It comprises a casing 91, which is shaped approximately as a pen. In the short side of the casing there is an opening 92. The short side is intended to abut against or be held a short distance from the surface from which the position-coding pattern is to be recorded.

The casing accommodates essentially an optics part, an electronic circuitry part and a power supply.

The optics part comprises at least one light-emitting diode 93 for illuminating a partial area on the surface with a position-coding pattern and a light sensitive area sensor 94 (corresponding to the sensor S in FIG. 1), for instance a CCD or CMOS sensor, for recording a two-dimensional image of the position-coding pattern on the surface. Optionally, the device may additionally contain an optical system, such as a mirror and/or lens system. The light-emitting diode can be an infrared light-emitting diode, and the sensor may be sensitive to infrared light.

The power supply for the user unit is obtained from a battery 95 which is mounted in a separate compartment in the casing. It is also conceivable to supply power via a cable from an external power source (not shown).

The electronic circuitry part comprises a processor unit 96 with a processor which is programmed to read images from the sensor and to decode the position-coding pattern in these images, and a working memory and a program memory. The processor can also be programmed to execute certain operations on the basis of the decoded information. The processor can, for example, send information to a specific address included in the decoded information as a result of its interpreting and processing of the decoded information. To this end, there is a description of the second coordinate system's division into coordinate partial areas 9 and the coordinate fields' extent in these coordinate partial areas stored in a storage 901 in the user unit. The description may also, as mentioned above, include information associated with the different coordinate partial areas, such as information about the different functions of the coordinate partial areas, page sizes and offsets.

In this embodiment, the user unit further comprises a pen point 97 (corresponding to the pen point T in FIG. 1), by means of which the user can write conventional ink-based writing on a base from which the coding pattern is to be recorded. The pen point 97 can be retractable and extendable so that the user can control whether it is to be used or not. In some applications, the user unit does not need to have a pen point at all.

The ink-based writing is suitably of such a type that it is transparent to infrared light and the marks absorb infrared light. By using a light-emitting diode which emits infrared light, and a sensor which is sensitive to infrared light, the detection of the pattern takes place without the above-mentioned writing interfering with the pattern.

As indicated in FIG. 12, the pen point 97 is positioned outside the field of view of the sensor. In the plane of the position-coding pattern, the pen point is thus offset in the plane from the projection of the sensor surface on the plane so that the pen point is not positioned within the image recorded by the sensor.

Therefore, software is also stored in the user unit 2, making it possible for the user unit to carry out correction for the displacement of the pen point, i.e. to calculate, on the basis of the position-coding pattern read by the sensor, the coordinates, corresponding to the location of the pen point, in the first and the second coordinate system.

The user unit 2 may further comprise buttons 98 by means of which the device is activated and controlled. It also has a transceiver 99 for wireless transmission, for instance using IR light, radio waves or ultrasound, of information to and from the device. The user unit 2 may further comprise a display 900 for showing recorded and/or processed information.

The user unit may be divided into different physical casings, a first casing containing components which are necessary for recording images of the coding pattern and for transmitting these to components which are located in a second casing and which decode the coding pattern in the recorded image or images.

Figure 13:
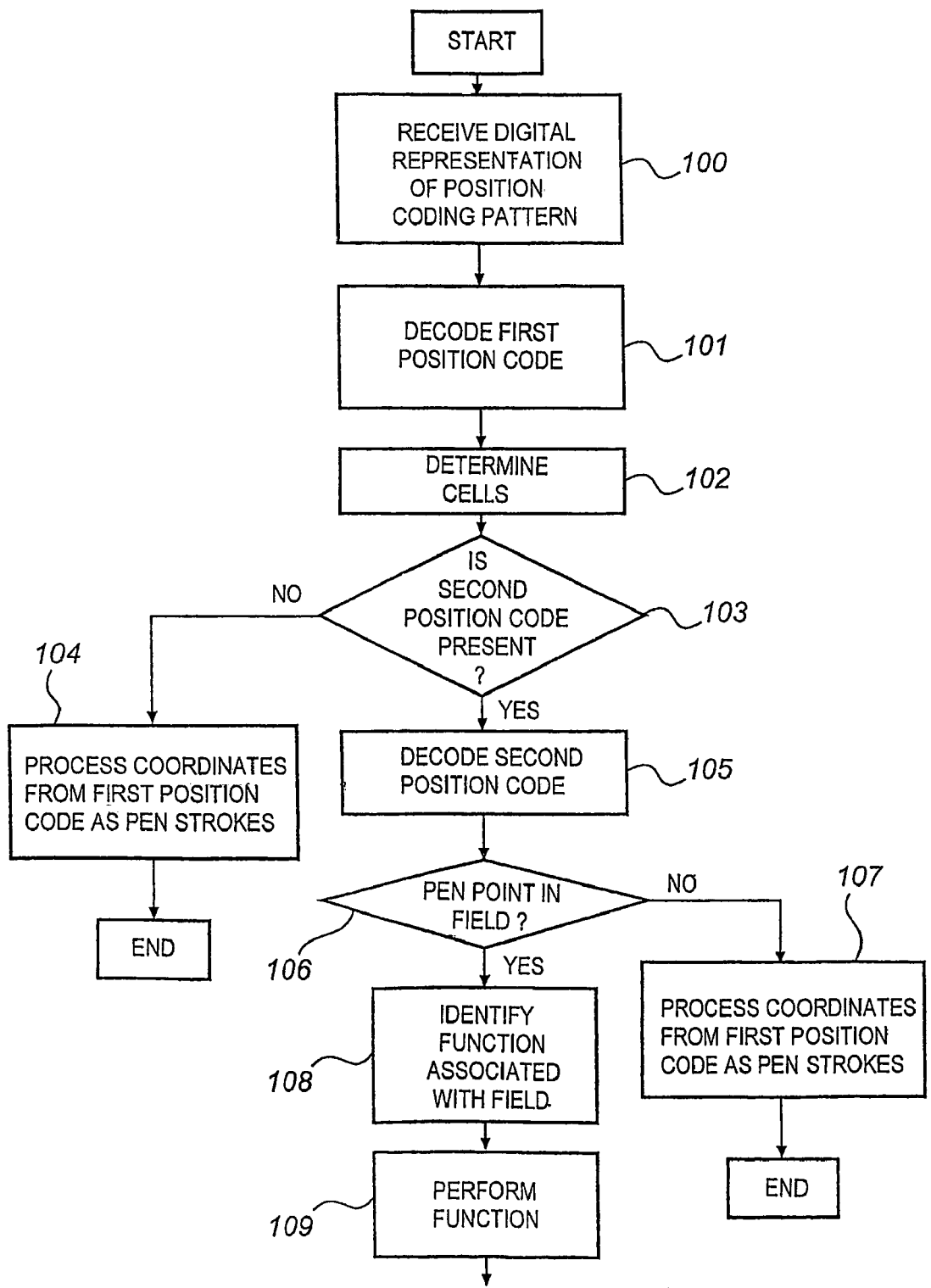
FIG. 13 is a flow chart and shows an example of how decoding of the first and the second position code can be carried out.

An example of how the coding pattern can be decoded will now be described with reference to FIG. 13.

In a first step 100, the processor unit 96 in the user unit 2 receives a digital representation of the position-coding pattern which the sensor 94 has recorded locally at the end of the user unit. Then the processor unit decodes the first position code by identifying the marks in the digital representation, determining the virtual raster and the location of the marks in relation to this, and calculating coordinates for a point in the first coordinate system, step 101, on the basis of the location of a predetermined number of the identified marks. A more detailed description of how the position information can be decoded is given in WO 01/26032.

When the first position code has been decoded, the processor unit can determine in step 102 how the cells used for decoding the second position code are located. Once the location of the cells is determined, the processor unit knows which marks belong to the respective cells in the digital representation of the position-coding pattern. The processor unit may then determine the size of the marks in the cells in the digital representation. Since it is given that each cell should contain two small and two large marks or merely four small marks, the processor unit 96 can relatively easily determine which marks are small and which are large by comparing the sizes of the marks with each other. Nevertheless, a more detailed description of how this is done follows below. When the sizes of the marks in the cells in the digital representation have been established, the processor unit 96 determines whether the position-coding pattern in the digital representation contains the second position code, step 103. For this to be the case, there must be at least a predetermined number of cells in which the marks are of different sizes for a cell value to be determined. When the second position code cannot be detected, the coordinates for the point in the first coordinate system are processed as coordinates belonging to an ordinary pen stroke on the surface, step 104.

However, if the second position code can be detected, the processor unit decodes, step 105, the second position code. More specifically, the processor unit determines the cell value of each of a predetermined number of cells, for instance by using a table which is stored in the memory of the user unit. With the aid of the thus determined cell values, the processor unit can then determine the coordinates for a point in the second coordinate system according to the same principles as used in the determination of the coordinates for a point in the first coordinate system.

When the second position code has been decoded, the processor unit can determine if the pen point of the user unit is located in a field on the surface, step 106. If this is not the case, the coordinates decoded from the first position code are processed in the memory as coordinates belonging to an ordinary pen stroke on the surface, step 107. On the other hand, if the processor unit determines that the pen point of the user unit is located in a field, it identifies which function is associated with the field, step 108, and performs this function, step 109. The function can, but need not, involve the coordinates decoded from the first position code.

The coordinates that are decoded by means of the first and second position code are coded by that partial area of the position-coding pattern which is within the field of view of the sensor. If the sensor is displaced from the pen point, the pen point has another position than the sensor and therefore the coordinates decoded by the user unit do not entirely mirror the position of the pen point. For this reason, the decoding of the position-coding pattern may comprise a correction for the pen point displacement. The correction can be carried out in the manner described in WO 01/71654. It can also be carried out as follows.

When the position-coding pattern on the surface is imaged by the sensor in the user unit 2, the image may be deformed owing to defects in the imaging system. Moreover, the position-coding pattern will frequently be imaged with perspective displacements owing to the user unit being inclined when used and therefore the sensor surface of the sensor being inclined in relation to the position-coding pattern. For the locations of the marks to be determined, the perspective must therefore first be straightened out in the image. This is done by first determining the coordinates in the sensor's coordinate system for each mark identified in the image. Then a transformation to a straightened coordinate system, a so called raster coordinate system, is made. To this end, use is made of a homogeneous transform. More specifically, first a two-dimensional column vector is determined, where each element contains the x and y coordinates (in the sensor's coordinate system) for all marks identified in the image. Each element is then increased by the value 1 and thus contains the triplet x,y,1. Then the column vector from the left is multiplied by a transformation matrix of the size 3×3. The matrix element furthest down to the right in the transformation matrix is one. The other elements are calculated so that the transformation matrix transforms the raster lines imaged in perspective in the sensor image so that they become orthogonal and have integer distances (see also Digital Image Processing, Rafael C. Gonzalez and Richard E. Woods, Addison-Wesley Publishing Company, Inc., 1993, ISBN 0-201-60078-1, in particular pp 61-68). When the column vector is multiplied by the transformation matrix, a new column vector is obtained which in each element has the triplet x,y,z. If x and y are divided by z, the x and y coordinates are obtained for the marks in the raster coordinate system. Even if the pen point (T in FIG. 1, 97 in FIG. 12) is not imaged in the sensor image, it is possible to determine its position in the sensor coordinate system based on the knowledge of the location of the pen point in relation to the sensor and the rotation of the user unit in relation to the imaged position-coding pattern. The above-mentioned transformation may then also be used to transform the position of the pen point from the sensor's coordinate system to the raster coordinate system.

Figure 14:
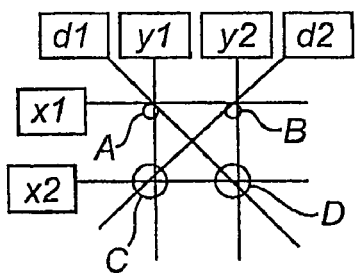
FIG. 14 shows schematically how difference groups are defined for a cell in the second position code.

In the following the decoding of the values of the cells will be described in more detail with reference to FIGS. 14 and 15. FIG. 14 shows a cell with four dots, where the two uppermost dots are small and the two lowermost large. The dots are designated A-D in the order up to the left, up to the right, down to the left and down to the right. In the decoding of the value of the cell, the sizes of the dots are compared in pairs. The following difference groups are defined, which are also indicated in the Figure:

$d1 = sA - sD$ $d2 = sB - sC$ $x1 = sA - sB$ $x2 = sC - sD$ $y1 = sA - sC$ $y2 = sB - sD$ where sA stands for the size of the dot A, sB for the size of the dot B, sC for the size of the dot C and sD for the size of the dot D.

Moreover the following probabilities are defined:
P1=probability that the dots in the group have the same size
P2=probability that the first dot in the group is larger than the second dot
P3=probability that the second dot in the group is larger than the first dot.

The probabilities P1, P2, P3 can be defined as follows:

$P1 = \exp(-(d^2/v))$

If $d < 0$ $P2 = 0$ $P3 = 1 - P1$

Else $P2 = 1 - P1$ $P3 = 0$ where d=the difference in size between the first and the second dot in the group, the size being measured in number of pixels in the image of the dot, and P1+P2+P3=1. Moreover, v is the variance of the dot sizes. This variance v can be set so that the desired performance is achieved in decoding. With a great value of v, it is more probable that two dots in a group are estimated to be of the same size. The ideal value of v depends on the quality in the image-processing which determines the size of the dots.

Figure 15:
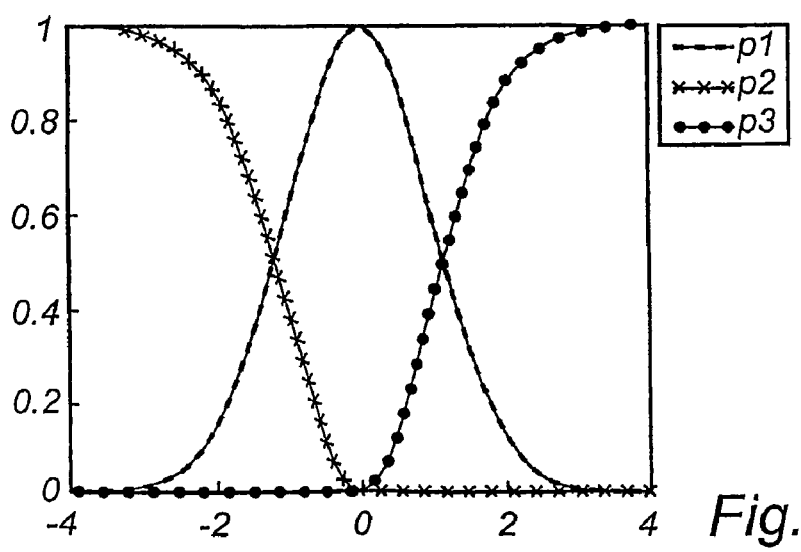
FIG. 15 shows a plot of probability values.

FIG. 15 shows a plot of P1, P2 and P3, where the variance is set at 2.

The cells can have the cell values 0-4, where 0 means that all dots are small, i.e. that the second position code cannot be detected, and the cell values 1-4 correspond to the bit pairs 0,0; 0,1; 1,0; and 1,1; according to FIG. 9. The probability of the different cell values 0-4 is given by the following:
0: P1d1*P1d2*P1x1*P1x2*P1y1*P1y2
1: P1d1*P1d2*P2x1*P3x2*P2y1*P3y2
2: P1d1*P1d2*P3x1*P2x2*P3y1*P2y2
3: P2d1*P2d2*P1x1*P1x2*P2y1*P2y2
4: P3d1*P3d2*P1x1*P1x2*P3y1*P3y2 or
0: min(P1d1, P1d2, P1x1, P1x2, P1y1, P1y2)
1: min(P1d1, P1d2, P2x1, P3x2, P2y1, P3y2)
2: min(P1d1, P1d2, P3x1, P2x2, P3y1, P2y2)
3: min(P2d1, P2d2, P1x1, P1x2, P2y1, P2y2)
4: min(P3d1, P3d2, P1x1, P1x2, P3y1, P3y2)

Each cell is assigned the cell value which has the highest probability. More advanced procedures for selecting cell value on the basis of probability calculations may also be used.

Below follows a specific example of determination of cell values as described above: Assume that the processor unit in a cell has identified four marks of the sizes: sA=6, sB=7, sC=4 and sD=5 pixels. By using the variance v=2 and min( . . . ) definition for the cell values, the following difference groups are obtained:
d1=1
d2=3
x1=−1
x2=−1 y1=2
y2=2
the probabilities:
P1d1=0.6065
P2d1=0.3935
P3d1=0
P1d2=0.0111
P2d2=0.9889
P3d2=0
P1x1=0.6065
P2x1=0
P3x1=0.3935
P1x2=0.6065
P2x2=0
P3x2=0.3935
P1y1=0.1353
P2y1=0.8647
P3y1=0
P1y2=0.1353
P2y2=0.8647
P3y2=0 and the cell value probabilities:
0=0.0111
1=0
2=0
3=0.3935
4=0 which give that the cell value is 3.

The positions decoded by means of the first position code and the positions decoded by means of the simultaneously recorded second position code should represent the same movement of the pen over the position-coded surface. Therefore the decoding can be improved by matching the positions decoded from the first position code against the positions decoded from the second position code. Thus, by matching successive positions decoded from the first and second position codes, incorrectly decoded positions can be detected. Furthermore, if e.g. the different cell values with associated probability values are stored for successive positions, incorrectly decoded positions from the second position code can be detected and/or a most probable sequence of positions can be selected to constitute the decoded positions from the second position code. This idea of matching positions from overlaid or superimposed first and second position codes can be used for all kinds of overlaid position codes and independently of for what reason the position codes are overlaid or superimposed.

ALTERNATIVE EMBODIMENTS

In the examples above, the second position code is used for marking fields on a base or surface. In an alternative embodiment the second position code can be used for enabling a unit, which receives information recorded by means of a pen and a position-coding pattern on a base, to re-create the movement of the pen over the base. This embodiment is described with reference to FIG. 16, which schematically shows a digital template 160 and a position-coded surface in the form of a paper product 165. The digital template 160 defines a plurality of different partial areas, e.g. a writing area 161, ICR areas 162, selection areas 163 for selection of different alternatives and a send area 164. The digital template is valid for a predetermined part of the first position code. The predetermined part can be divided into a number of subareas or pattern pages, which all have the same size and which all have the different partial areas 161-164 defined by the template 160.

Figure 16:
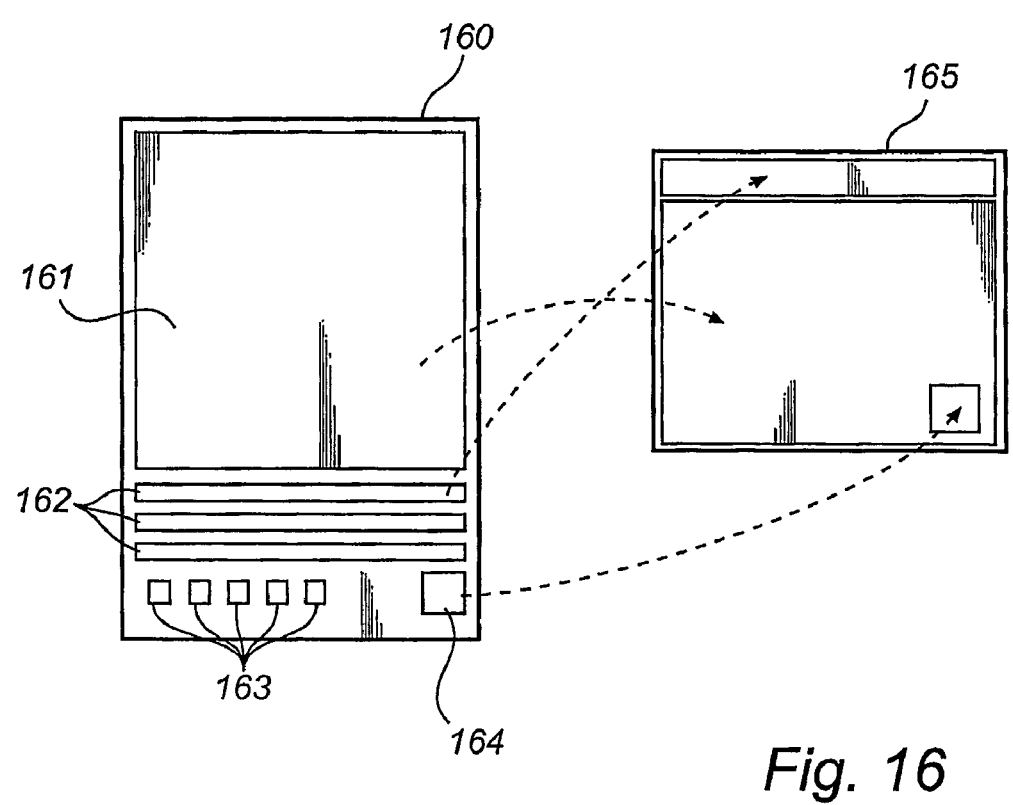
FIG. 16 shows schematically how partial areas of a position code can be cut out from a digital template and assembled in a different spatial arrangement on a surface.

When a user wants to create a paper product 165 with position code, he may cut out different partial areas from the digital template, or rather from one of the different pattern pages for which the digital template is valid, and arrange them in a different mutual arrangement, as suggested by the arrows in FIG. 16.

Since the digital template corresponds to a continuous part of the first position code, the first position code will be discontinuous between adjacent fields, e.g. fields 162' and 161' on the paper product. The pen used for recording information from the paper product 165 need not know the relationship between the fields on the paper product. It suffices that it has access to the digital template 160 in order for it to be able to handle the information, i.e. the coordinates, recorded from the paper product 165. However, if the movement of the pen over the base is to be displayed by an external unit, e.g. a PC, to which the coordinates are sent, the PC needs to know the spatial arrangement of the fields on the paper product.

This problem can be solved by overlaying a second continuous position code on the first position code. The PC can then use the second position code for determining how a pen which has recorded coordinates in the non-adjacent coordinate areas by means of the first position code, was moved over the surface when recording the coordinates.

As an alternative to sending the coordinates decoded from both the first and the second position code, the coordinates decoded from the first position code and offset indications can be sent to the external unit.

More particularly, for each pen stroke, the pen first determines a first offset of the pen from the upper left corner of the page. This first offset could be determined by means of the second position code. Then the pen sends the coordinates decoded from the first position code to the external unit, which now know how these coordinates are related to the upper left corner of the page. As soon as the pen discovers a discontinuity in the first position code which discontinuity has no correspondence in the second position code, it knows that it is passing from one cut-out field to another. As a result it determines a second offset in relation to the upper left corner by means of the second position code and sends the second offset to the external unit, which then knows how the coordinates received after the detection of the discontinuity relates to the upper left corner and thus to the coordinates received before the detection of the discontinuity.

In the examples above, use is furthermore made of a position-coding pattern, in which the first position code is coded by means of the location of the marks and the second position code is coded by means of the size of the marks. Of course, both the first and the second position code can be coded by means of other parameters than those exemplified here. As an alternative, the shape of a mark can be used as a parameter. The marks can, for example, have different values on the basis of whether they are circular, triangular, rectangular, star-shaped, elliptic, hexagonal or of some other detectable shape. In order to be able to detect different shapes in different perspectives and different lighting, it may however be necessary to use a sensor with relatively high resolution. As a further alternative, the color of the mark can be used, so that the value of the mark depends on the color. However, for this purpose, a color sensor is required, or illumination with light of different wavelengths.

In the examples described above, the marks are also in the form of circular dots. It is of course possible to use marks of a different shape, for example, triangular, square, elliptic, rectangular or hexagonal dots.

In the examples described above, all the cells have two large dots and two small dots or four small dots for coding of five different cell values. It is of course possible to have smaller or larger cells with fewer or more cell values which are coded with other combinations of values of the second parameter.

The principle of using a second position code for marking fields with special functions can also be used for position-coding patterns of essentially different construction. For instance, the position-coding pattern does not need to be floating.

In the examples described above, the first and the second position code are coded with common marks which have a first parameter which codes the first position code and a second parameter which codes the second position code.

It is also conceivable to use common marks which only vary in one parameter. In this case, a predetermined number of marks code a number, which can be expressed with a predetermined number of bits or digits. Of these bits or digits, a first predetermined number is then used to code the first position code, and a second predetermined number to code the second position code.

In the examples above, the same marks in an image are used for determining both a position corresponding to the first position code and a position corresponding to the second position code. However, if more marks are detected in an image recorded by the pen than are strictly needed for decoding a position from the first position code and/or a position from the second position code, different marks in the image may be used for decoding the positions from the first and second position codes, respectively.

Examples of methods for coding and decoding have been described above. The steps of these methods can at least partly be carried out in a different order.

The methods can, as has been made evident, be realized in a coding device and a device for recording of information from a surface, which each have a processor unit and associated computer programs. The methods can also be realized with some other type of signal processor, for instance application specific hardware, such as an ASIC or FPGA or a similar unit, which can be adjusted so that it will be suited for this specific task and with analog and/or digital circuits or a suitable combination thereof.

The invention claimed is:

1. A product comprising:
   a base;
   a first position code provided to define coordinates for a plurality of first points, said first position code allowing a user unit to determine positions from the entire surface of the base;
   a user-identifiable field provided on the base, the field being associated with a predetermined function to be performed in consequence of a user unit being placed in the field;
   at least one partial area including said field; and
   a second position code provided to define coordinates for a plurality of second points, said second position code allowing a user unit to determine positions from within said at least one partial area.

2. The product as claimed in claim 1, wherein said plurality of first points are points in a first coordinate system and said second points are points in a second coordinate system.

3. The product as claimed in claim 1, wherein said partial area is larger than the field.

4. The product as claimed in claim 1, wherein the second position code is spatially separated from the first position code.

5. The product as claimed in claim 1, wherein each of the first and the second position code is coded with marks, and wherein at least some marks in the partial area are common to the first and the second position code.

6. The product as claimed in claim 5, wherein the first position code is coded by variation of a first parameter of the common marks and the second position code is coded by variation of a second parameter of the common marks.

7. The product as claimed in claim 6, wherein the first and the second parameter are one of the following pairs: location and size; location and color; location and shape; size and location; size and shape; size and color; shape and location; shape and color; shape and size; color and location; color and size; and color and shape.

8. The product as claimed in claim 1, wherein the coordinates for each of said plurality of first points are coded by means of a first plurality of marks and the coordinates for each of said plurality of second points are coded by means of a second plurality of marks.

9. The product as claimed in claim 8, wherein said second plurality of marks are divisible into cells with at least two marks, each cell defining a cell value and the cell values of the cells corresponding to said plurality of second marks together coding the coordinates for one of said second points.

10. The product as claimed in claim 1, wherein the first and the second position code have different position resolutions.

11. The product as claimed in claim 1, wherein the field has a function from the following group of functions: giving a predetermined feedback to a user when the field is detected, interpreting by character recognition the information recorded from the field by means of the first position code in the same or sending information recorded by means of a predetermined part of the first position code to an address.

12. The product as claimed in claim 1, further comprising:
    at least two adjacent fields, wherein the first position code in said at least two adjacent fields codes coordinates within at least two non-adjacent coordinate areas, and wherein the second position code extends over said at least two adjacent fields.

13. A method for coding, which method is carried out in a coding device and which comprises:
    providing a first position code which is adapted to be arranged over a surface of a base and which codes coordinates for a plurality of first points, said first position code allowing a user unit to determine positions on an entire surface of the base; and
    providing a second position code which codes coordinates for a plurality of second points and which is adapted to be arranged over at least one partial area on the surface of the base, said second position code enabling detection of a field associated with a predetermined function which is to be performed when a user unit is placed in the field.

14. The method as claimed in claim 13, further comprising:
    printing the first position code on the entire surface of the base; and
    printing the second position code over at least one partial area on the surface of the base.

15. The method as claimed in claim 13, wherein said partial area is larger than the field.

16. The method as claimed in claim 13, further comprising:
associating a size of a coordinate area coded by the first position code with the second position code which is adapted to be arranged over said at least one partial area.

17. A computer program comprising instructions for causing a computer to carry out a method according to claim 13.

18. A coding device comprising:
a signal processor configured to
provide a first position code which is adapted to be arranged over an entire surface of a base and which codes coordinates for a plurality of first points, the first position code allowing a user unit to determine positions on the entire surface of the base; and
provide a second position code which codes coordinates for a plurality of second points and which is adapted to be arranged over at least one partial area of the base, the second position code allowing a user unit to detect a field which is associated with a predetermined function to be carried out when a unit is placed in the field.

19. A method for recording information from a surface of a base, said base being provided with a first position code which codes coordinates for a plurality of first points, and which, in at least one partial area, is further provided with a second position code which codes coordinates for a plurality of second points, the method comprising:
obtaining an image of the surface of the base using a user unit;
determining whether the second position code is present in the recorded image;
if the second position code is detected in the image, determining, the coordinates for at least one of said plurality of second points by means of the second position code; and
determining, on the basis of the determined coordinates, whether the user unit is placed in a field on the surface, which field is associated with a function to be carried out by the user unit.

20. The method as claimed in claim 19, wherein the step of determining whether the user unit is placed in a field on the surface comprises:
comparing the determined coordinates with a description, stored in advance in the user unit, of a plurality of coordinate partial areas, which are coded by the second position code and in each of which a coordinate field is defined, which is associated with a function.

21. The method as claimed in claim 19, wherein the user unit comprises a sensor and, arranged at a distance from the sensor, a pen point defining the location of the user unit, and wherein the step of determining whether the user unit is placed in a field on the surface is carried out while taking the distance between the sensor and pen point into consideration.

22. The method as claimed in claim 19, further comprising the step of determining, if the user unit is placed in a field on the surface, a size of a coordinate area coded by the first position code on the surface by means of said description.

23. The method as claimed in claim 19, further comprising determining, if the user unit is placed in a field on the surface, the location of said partial area on the surface by means of said description.

24. A computer program comprising instructions for causing a computer to carry out a method according to claim 19.

25. A device for recording information from a surface of a base, the base being provided with a first position code coding coordinates for a plurality of first points and, in at least one partial area, is further provided with a second position code coding coordinates for a plurality of second points, the device comprising:
a signal processor adapted to
determine whether or not the second position code is present in an image of the surface recorded by means of a user unit;
determine the coordinates for at least one of said plurality of second points by means of the second position code if the second position code is determined to be present; and
determine, on the basis of the determined coordinates, whether the user unit is placed in a field on the surface of the base, where the field is associated with a function to be performed by the user unit.

26. The device as claimed in claim 25, further comprising a memory, in which is stored a description of a plurality of coordinate partial areas, which are coded by the second position code and in each of which a coordinate field is defined, which is associated with a function.

27. The device as claimed in claim 25, which further comprises a sensor and, arranged at a distance from the sensor, a pen point defining the location of the device, and in which the signal processor is further adapted to determine whether the user unit is placed in a field on the surface while taking the distance between the sensor and the pen point into consideration.

28. The device as claimed in claim 26, in which the signal processor is further adapted to determine a size of a coordinate area which is coded by the first position code on the surface by means of the description stored in the memory.

* * * * *